(12) United States Patent
Regueiro

(10) Patent No.: US 6,186,015 B1
(45) Date of Patent: Feb. 13, 2001

(54) BALL-NUT TRANSMISSION

(75) Inventor: Jose F. Regueiro, Rochester Hills, MI (US)

(73) Assignee: DaimlerChrysler Corporation, Auburn Hills, MI (US)

(*) Notice: Under 35 U.S.C. 154(b), the term of this patent shall be extended for 0 days.

(21) Appl. No.: 09/271,229

(22) Filed: Mar. 17, 1999

(51) Int. Cl.[7] .................................................. F16H 25/22
(52) U.S. Cl. ............................... 74/89.15; 74/424.8 NA
(58) Field of Search .................................. 74/424.8 NA, 74/459, 89.15; 464/167, 141

(56) References Cited

U.S. PATENT DOCUMENTS

| | | | |
|---|---|---|---|
| 28,613 | * 6/1860 | Spencer | 74/459 |
| 226,813 | * 4/1880 | Warren | 74/459 X |
| 389,603 | * 9/1888 | Schutz et al. | 74/459 |
| 1,498,171 | * 6/1924 | Kaps | 464/141 |
| 2,038,466 | * 4/1936 | Yates | 464/167 X |
| 2,795,398 | * 6/1957 | Ragland | 464/20 |
| 3,020,736 | * 2/1962 | Babelay | 464/141 |
| 3,112,625 | * 12/1963 | Leto | 464/141 |
| 4,198,872 | * 4/1980 | Metz | 74/424.8 NA X |
| 4,199,999 | 4/1980 | Metz . | |
| 4,946,007 | * 8/1990 | Pederson et al. | 74/424.8 NA X |
| 5,168,767 | * 12/1992 | Morita | 74/424.8 NA |
| 5,241,874 | * 9/1993 | Matsuhama | 74/459 X |

* cited by examiner

Primary Examiner—Rodney H. Bonck
(74) Attorney, Agent, or Firm—Kenneth H. Maclean

(57) ABSTRACT

A ball-nut transmission in which each of the balls used for transferring drive between a shaft member and a nut member are encapsulated between a hemispherical cavity formed in one of the members and a helical groove provided in the other of the members.

12 Claims, 3 Drawing Sheets

BALL-NUT TRANSMISSION

FIELD OF THE INVENTION

This invention relates to power transmission devices and more particularly concerns a ball-nut transmission in which a pair of concentric members are connected together by a plurality of balls for transferring directional forces from one of the members to the other by rotation of one of the members.

BACKGROUND OF THE INVENTION

One form of power transmission that has found general acceptance for transferring drive from one member to an adjoining concentric member is the so called recirculating ball-nut screw device. Such devices provide low-friction, low wear and efficient operation under varying temperature and humidity conditions, and were first used on aircraft for moving the wing flaps from a stowed position to an extended position and vice versa. In general, devices of this type consist of recirculating balls guided within a helical ball duct defined between a screw and nut with the balls being continuously recirculated throught the helical duct and through ball return means provided on the nut. Apart from the aviation field, the recirculating ball-nut screw device has many other uses as a linear motion device replacing the threaded nut-and-screw jackshaft-type mechanism. In these uses, the non-rotating nut is typically attached to the linearly movable part of the mechanism while the screw rotates to drive the nut. There are some cases in the machine design field where the use of the recirculating ball-nut screw device could be the ideal choice but cannot be used because of the bulk and disposition of the recirculating ball-return duct interfering with another part of the mechanism.

One form of a ball-nut screw device that eliminates the need for recirculating the balls can be seen in U.S. Pat. No. 4,199,999 issued on Apr. 29, 1980 in the name of Joseph R. Metz. This patent discloses a ball-type mechanical transmission which includes a driver shaft having a rolled-in helical thread engaged by several balls carried in through-openings formed in a sleeve surrounding the shaft. A cylindrical jacket encircles the sleeve so as to provide a back-up bearing surface for the balls and also constitutes a slide having intermediary bearing means within an outer housing. The housing further provides bearings for the shaft and for a connector part constituting the output of the transmission.

Although the above mentioned Metz patent provides a ball-nut transmission without requiring the balls to be recirculated, the use of a separate sleeve for holding the balls and a separate cylindrical jacket sleeve for maintaining the balls in the sleeve openings increases the complexity and cost of the transmission. In addition, by positioning the balls within a cylindrical opening in the sleeve as taught by the Metz patent, a point contact exists between each ball and the surface of the jacket and a circular line contact exists between the ball and the inner edge of the cylindrical opening in the sleeve. The problem with the point contact and line contact between the parts is that high stress concentrations are created in those areas resulting in increased wear in the assembly.

SUMMARY OF THE INVENTION

The ball-nut transmission according to the present invention is functionality similar to the ball-nut transmission seen in the Metz patent but differs therefrom in that it achieves maximum compactness with minimum stress concentrations, saves weight, and provides maximum shear strength for the balls. Moreover, rather than utilizing separate members for maintaining the balls confined in cylindrical openings of a sleeve by providing a separate jacket, the ball-nut transmission according to the present invention encapsulates the individual balls within a hemispherical cavity formed in the inner cylindrical surface of the nut member. Each of the hemispherical cavities is formed by a tool such as a ballend mill which passes through an access hole located in the body of the nut member diametrically opposite to the cavity. The access holes serve to not only provide a means for forming the hemispherical cavities in the inner cylindrical surface of the nut member but also serve to lessen the weight of the nut member by removal of some of the metal from the nut member. Prior to assembly of the screw shaft member and the nut member, a viscous lubricant such as grease is placed in each of the cavities. The balls are then placed in each of the cavities and retained therein by the lubricant while the screw shaft member is inserted within the nut member and rotated into the assembled position. Once assembled, each ball is encapsulated between the accommodating cavity and the groove in the shaft member where there is limited contact (line contact) that spreads out wear over the whole length of the groove.

In a modified version of the ball-nut transmission according to the present invention, the outer cylindrical surface of the shaft member is provided with a plurality of hemispherical cavities located along a helical path. Each of the cavities in the cylindrical surface of the shaft member is provided with a ball retained therein in the same manner as explained above. In this instance, the inner surface of the cylindrical opening within the nut member is provided with a helical groove having the same pitch as the pitch of the helical path along which the cavities are formed in the outer cylindrical surface of the shaft member. Thus, when the shaft member is threaded into the nut member, the balls of the shaft member interact with the grooves for retaining the balls and providing a ball-nut transmission device that operates in the manner of the arrangement as explained above albeit providing limited axial movement of the shaft member relative to the nut member.

Accordingly, one object of the present invention is to provide a new and improved ball-nut transmission in which each of the balls used for transferring drive between a shaft member and a nut member are encapsulated between a hemispherical cavity formed in one of the members and a helical groove provided in the other of the members.

Another object of the present invention is to provide a new and improved ball-nut transmission consisting of a shaft member and a nut member and in which a cylindrical opening within the nut member has its inner surface formed with a plurality of hemispherical cavities each of which is adapted to support a ball that interacts with a groove formed in the outer surface of the shaft member for coupling one of the members to the other.

A further object of the present invention is to provide a new and improved ball-nut transmission consisting of a shaft member and a nut member and in which the outer cylindrical surface of the nut member is formed with circumferentially spaced access holes each of which permits a tool to extend through the access hole to form a hemispherical cavity in the inner surface of the cylindrical opening in the nut member.

A still further object of the present invention is to provide a new and improved ball-nut transmission in which the shaft member is formed with a helical groove and the nut member has a cylindrical outer surface and a cylindrical inner surface defining a cylindrical opening that is formed with a plurality of hemispherical cavities located along a helical path the pitch of which is equal to the pitch of the helical groove formed on the shaft member.

A still further object of the present invention is to provide a new and improved ball-nut transmission consisting of two major parts and a plurality of balls and in which one of the major parts is a shaft member having a helical groove cooperating with the other of the major parts which is a nut member for converting rotary movement into linear movement and vice versa and further in which a plurality of balls interconnect the two members and are encapsulated therebetween by having each of the balls located in a hemispherical cavity formed in the nut member and located along a helical path having the same pitch as the pitch of the helical groove.

The above and other objects are realized in accordance with the present invention by a ball-nut mechanical transmission which serves to convert rotary movement into linear movement. In the preferred form, the ball-nut transmission includes an elongate cylindrical shaft member and a nut member having a cylindrical opening for receiving one end of the shaft member. The nut member is formed with an inner cylindrical surface defining the cylindrical opening and an outer cylindrical surface which is substantially concentric with the inner cylindrical surface. The shaft member is located within the cylindrical opening in the nut member and has an outer cylindrical surface formed with a helical groove. A plurality of circumferentially spaced hemispherical cavities which are semi-circular in cross-section are formed in the inner surface of the nut member along a helical path that matches the helical groove in the outer cylindrical surface of the shaft member. A spherical ball is located in each of the hemispherical cavities with the helical grooves engaging each of the spherical balls so that rotation of one of the members relative to the other member causes the other of the members to move in an axial direction. In addition, an access hole is formed between the outer cylindrical surface and the inner cylindrical surface of the nut member in a diametrically opposed position relative to each of the cavities to allow a tool to move through the access hole and form the cavity for the spherical ball.

A more complete understanding of the present invention can be obtained from the following detailed description when taken with the drawings in which.

DETAILED DESCRIPTION OF THE INVENTION

Figure 1:
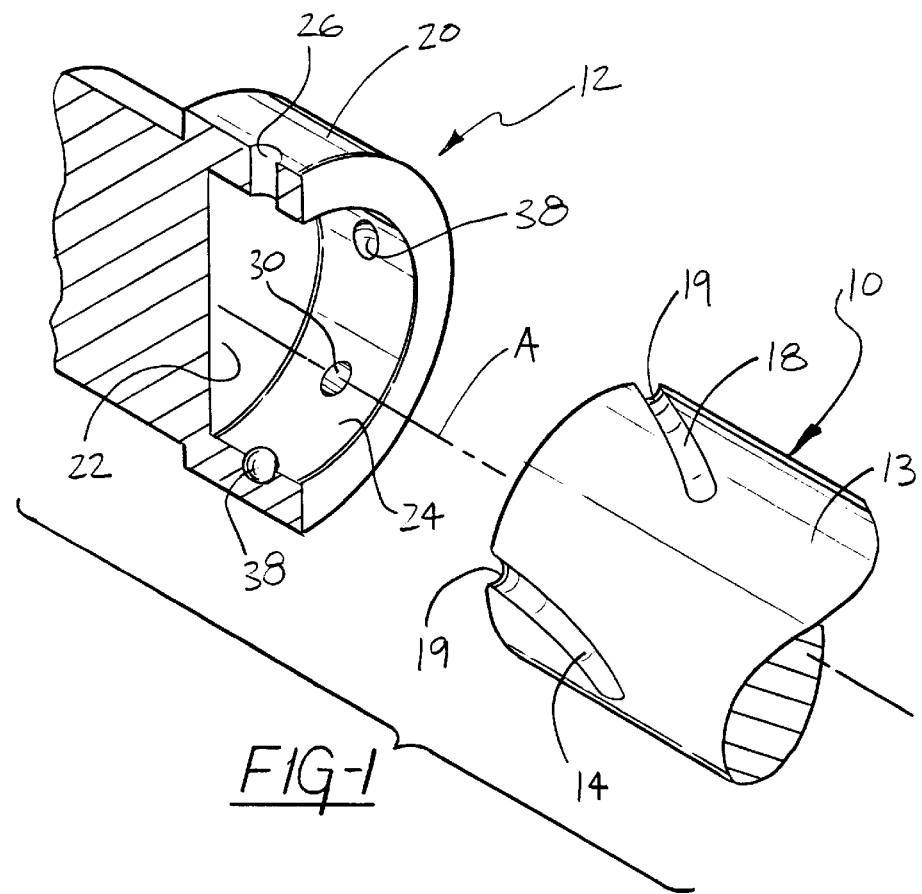
FIG. 1 is an isometric view of a ball-nut transmission with some of the parts broken away and including a shaft member and a nut member made in accordance with the present invention and prior to assembly.
Figure 2:
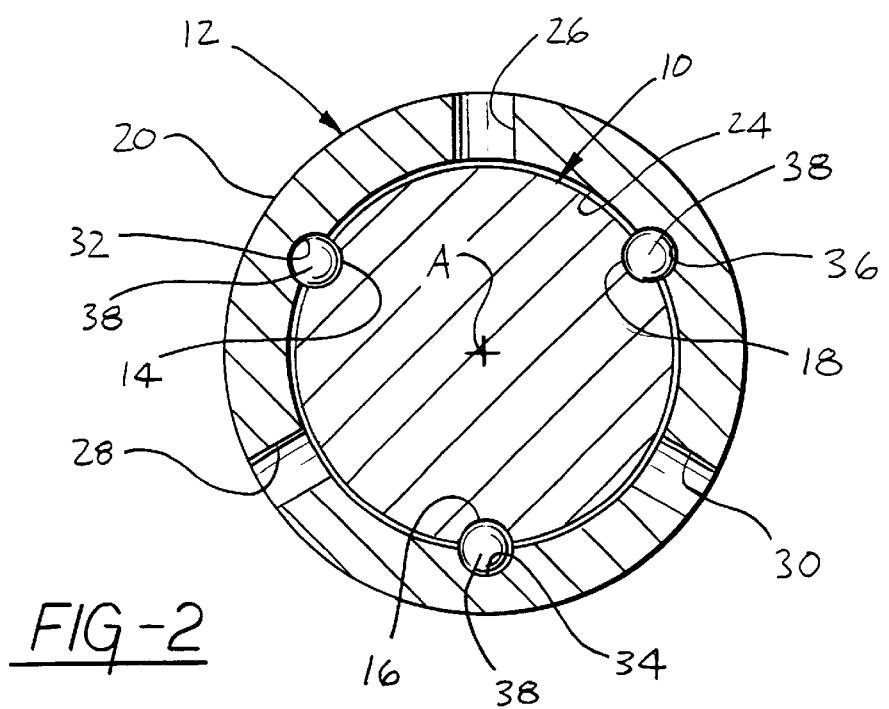
FIG. 2 is a cross-sectional view of the shaft member and the nut member of FIG. 1 after assembly of the two members.

Referring now to the drawings and more particularly FIGS. 1 and 2, a pair of members 10 and 12 are shown with the member 10 taking the form of a cylindrical shaft of uniform cross section while the member 12 can be considered to be a either a nut member, a hub member or a secondary shaft member. FIG. 1 shows the members 10 and 12 separated from each other while FIG. 2 shows a cross sectional view of the members 10 and 12 when they are combined or interconnected to form what can be referred to generally as a ball-nut transmission made according to the present invention.

As seen in FIGS. 1 and 2, the member 10 has its outer cylindrical surface 13 formed with three separate grooves 14, 16, and 18 each of which is semi-circular in cross section and is identically curved along a path simulating a helix. At the center of the end point 19 of each groove 14–18 and along each plane normal to the longitudinal center axis of the member 10 that intersects the grooves 14–18, the center of each of the grooves 14–18 are circumferentially spaced from each other by 120 degrees.

The member 12 is formed with a nut or hub portion having an outer cylindrical surface 20 and a round dead-end opening that terminates with a wall 22. The opening is defined by an inner cylindrical surface 24 that is concentric with the outer cylindrical surface 20. As seen in FIG. 2, three identical access holes 26, 28, and 30 are formed in the nut or hub portion of the member 12 along center axes intersecting at the center point of the member 12 as seen in FIG. 2. The center axes of the access holes 26–30 are circumferentially spaced 120 degrees from each other. Also, the center axis of each access hole 26–30 is located in a transverse plane that is positioned 90 degrees to the longitudinal center axis of the nut or hub portion. Each access hole 26–30 serves to allow a tool, such as a ballend mill (not shown), to be inserted therein along the longitudinal center axis of the hole and form a hemispherical cavity in the inner cylindrical 24 surface at a point diametrically opposed to the access hole through which the tool extends. In this manner, the inner cylindrical surface 24 is formed with three identical hemispherical cavities 32, 34, and 36 the center of each of which is circumferentially separated from each other by 120 degrees.

Each of the hemispherical cavities 32–36 is provided with a spherical ball 38 having a diameter approximating but slightly smaller than the diameter of the ball-end mill forming each of the hemispherical cavities 32–36. In this regard, it will be noted that each of the grooves 14–18 will be made with a tool (not shown) that forms a semi-circular groove having a depth that will approximate one-half the diameter of each ball 38. Thus, when the members 10 and 12 are interconnected as seen in FIG. 2, each of the balls 38 is fully encapsulated between the accommodating cavities 32–36 formed in member 12 and the semicircular grooves 14–18 formed in member 10. It can be appreciated that the full encapsulation of the balls 38 in the cavities 32–36 provides a surface-to-surface contact for one-half the diameter of the ball 38 with sufficient clearance between the outer surface of the ball 38 and the inner surface of the associated cavity to allow free rotation of each of the balls 38 relative to its supporting cavity. As to each of the grooves 14–18 in member 10, each ball 38 will have line contact with the associated semicircular groove so as to spread out the wear along the full length of the groove.

At this juncture, it will be noted that in assembling the two members 10 and 12, a viscous lubricant such as grease is first placed in each of the cavities 32–36. This is followed by positioning the balls 38 in the cavities 32–36. The lubricant will prevent each ball 38 located in the upper area of the cylindrical inner surface 24 from dropping out of its cavity. The member 12 is then inserted into the opening of the nut or hub member 10 with the end part 19 of each of the grooves 14–18 aligned with the three balls 38. Since the grooves 14–18 are located along identically curved paths, there will be a compound movement of the member 10. That is, the member 10 will move axially while simultaneously rotating until the end of the member 10 contacts the wall 22 in the nut or hub member 12. Accordingly, this form of a ball-nut transmission device provides limited axial and rotating movement of the member 12 relative to the member 10 and vice versa. Therefore, a coupling of this sort would be useful where only limited axial or rotative movement is needed such as in an automotive variable valve timing mechanism, a sewing machine, or a weaving loom.

It will be noted that if the grooves 14–18 were straight rather than curved and were positioned parallel to the longitudinal center axis of the member 10, one would only achieve relative axial movement of the members 10 and 12 without enjoying any relative rotation of the members 10 and 12 whatsoever. However, a coupling of this sort could be useful for joining a pair of concentric shafts and allow for thermal expansion or manufacturing tolerances by providing axial movement of one of the members relative to the other. It will also be noted that for low volume work each of the access holes 26–30 are formed by first marking the outer cylindrical surface 20 at three points spaced 120 degrees from each other and drilling each hole at the marked point with the longitudinal center of the drill bit aligned with the center of the cylindrical inner surface 24. In high volume manufacture, one would provide a jig for guiding a one or more drills for forming the access holes. If desired, the drills can be driven clear through to the opposite side of the inner cylindrical surface 20 to initiate the forming operation of the cavity. By so doing, the point where the cavity is to be located will be marked by the tip of the drill bit so that the ball-end mill can subsequently extend through the access hole and finish forming the hemispherical cavity.

FIGS. 3 through 6 disclose another form of the ball-nut transmission 39 according to the present invention. In this instance, a shaft member 40 is combined with a nut member 42 having a plurality of identical balls 44 interposed between the two members 40 and 42. The shaft member 40 is cylindrical in shape and has its outer cylindrical surface 46 formed with a single helical groove 48 providing in effect a thread extending from one end to the other of the shaft member 40. As in the case of the ball-nut transmission of FIGS. 1 and 2, the helical groove 48 is semicircular in cross section, having a depth and shape complementary to one-half the diameter of the ball 44.

The nut member 42 of the ball-nut transmission 39 is basically ring-shaped having an outer cylindrical surface 50 and a through-opening formed in the body of the nut member 42 that is defined by an inner cylindrical surface 52. The inner surface 52 of the nut member 42 has a plurality of identical hemispherical cavities (each identified by reference numeral 54) formed therein and rather than having the ball supporting cavities 54 located along a single plane normal to the longitudinal center axis of the nut member as in the case of the nut or hub member of FIGS. 1 and 2, in this instance, the ball supporting cavities 54 are located along a helical path having the same pitch as the helical groove 48 formed on the shaft member 40. As in the case of the nut or hub member of FIGS. 1 and 2, the nut member 42 is formed with a plurality of identical access holes 56 each of which, as seen in FIGS. 3–6, is located in a position diametrically opposite a cavity 54 for allowing a tool such as a ball-end mill to extend through the access hole 56 and form the cavity 54 in the inner cylindrical surface 52 of the nut member 42. Also, as in the case with the nut or hub member of FIGS. 1 and 2, each cavity 54 has a depth of one-half of the diameter of the ball 44 and is formed so as to have a semi-spherical surface to provide surface-to-surface contact with the associated ball 44.

Figure 3:
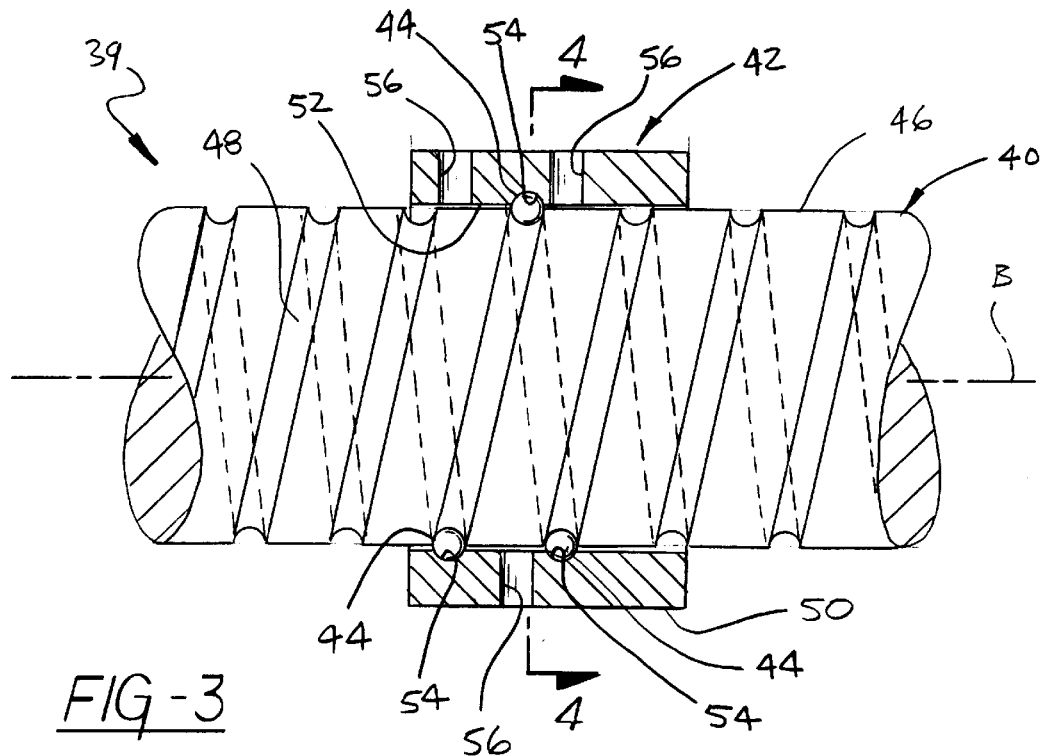
FIG. 3 is an elevation view with some parts broken away and showing another version of the ball-nut transmission according to the present invention in which the nut member and the shaft member are interconnected with each other.
Figures 4, 5:
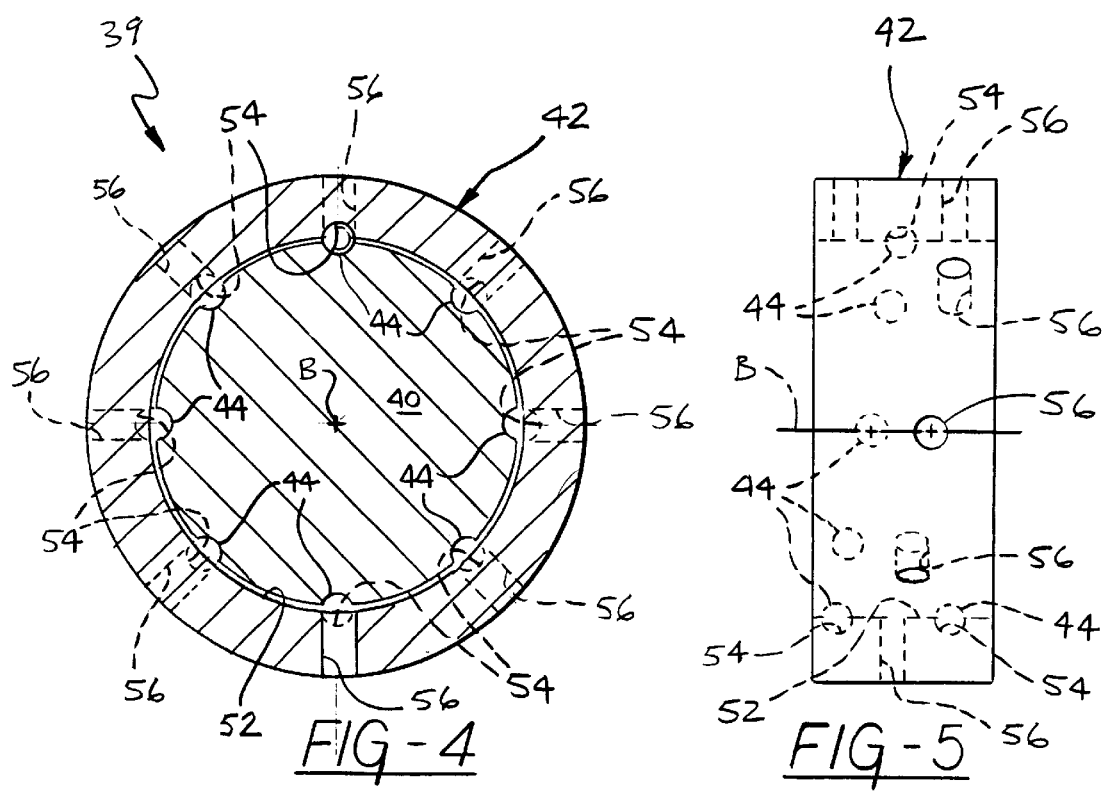
FIG. 4 is a sectional view taken on line 4—4 of FIG. 3.
FIG. 5 is a side elevational view of the nut member incorporated with the ball-nut transmission seen in FIG. 3.
Figure 6:
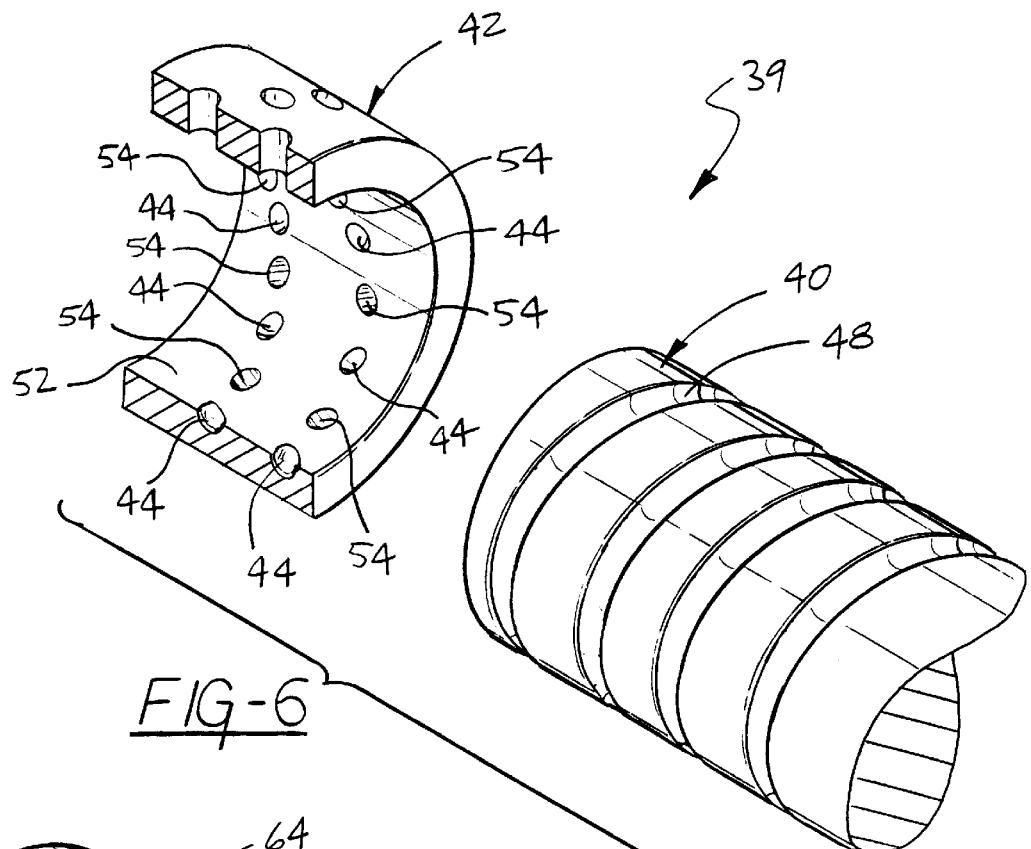
FIG. 6 is an exploded isometric view showing the shaft member and the nut member of the ball-nut transmission seen in FIGS. 3–5.

Prior to assembly of the shaft member 40 with the nut member 42, a viscous lubricant such as described hereinbefore will be placed in each of the cavities 54 for retention of the balls 44. Afterwards, the shaft member 40 is threaded into the nut member 42 to provide the assembled mechanism as seen in FIGS. 3 and 4. Once the shaft member 40 and the nut member 42 are assembled, rotation of the nut member 42 in a single transverse plane will cause the shaft member 40 to move alone the axial line B of the mechanism. Alternatively, rotation of the shaft member 40 while restraining the nut member 42 from rotative movement will result in the nut member 42 moving axially along the shaft member 40.

It should be apparent from the above description that the overall diameter of the ball-nut transmission 39 is substantially reduced as compared with a conventional recirculating ball-nut-screw device, due to the exclusion of the ball-return conduit. Yet the ball-nut transmission 39 operates functionally in the same manner as the conventional recirculating ball-nut-screw device. There are many applications where the nut portion of a conventional recirculating ball-nut-screw device, due to its weight, size and bulk, would not be the most desirable device to be used in a mechanism such as a variable valve timing device for an internal combustion engine or a vehicle's steering gear mechanism.

On the other hand, a ball-nut transmission 39 according to the present invention would lend itself well for use in either of those mechanisms.

Figure 7:
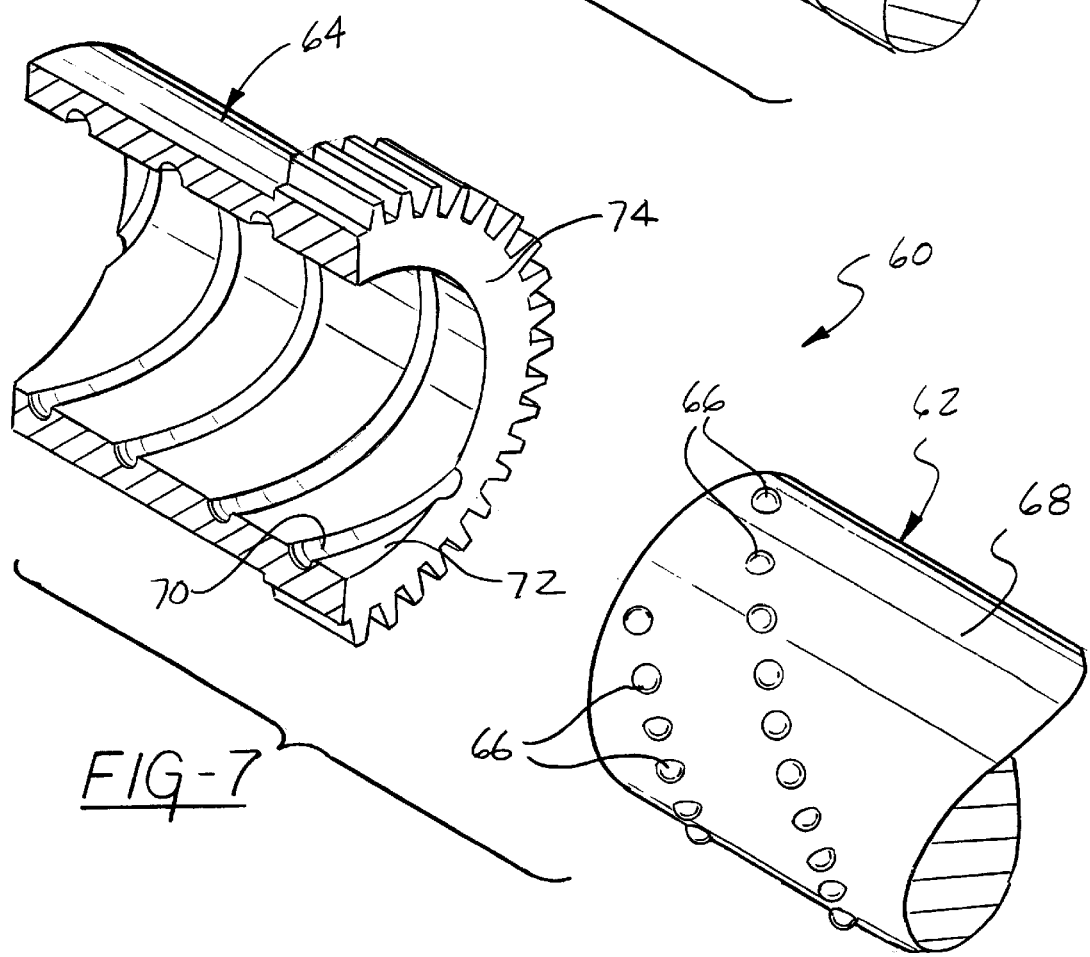
FIG. 7 is an exploded isometric view of a modified form of the ball-nut transmission seen in FIGS. 3–6.

In FIG. 7, another embodiment of the present invention is shown in which a ball-nut transmission 60, which includes a shaft member 62 and a nut member 64, is provided with balls 66 disposed in hemispherical cavities (not shown) formed along, a helical path on the outer cylindrical surface 68 of the shaft member 62. A complementary helical groove 70 of the same pitch as that of the helical path on the outer cylindrical surface 68 of the shaft member 62 is formed in the inner cylindrical surface 72 defining the circular opening in the nut member 64.

As should be apparent, the place for the helical groove 70 and the balls (6 are reversed from the arrangement shown in the ball-nut transmission 39 seen in FIGS. 3–6. In this case, the nut member 64 is formed with the helical groove 70 and the shift member 62 carries the balls 66 in cavities located along a helical path. Moreover, a gear 74 is integrally formed with the nut member 64 so as to provide a compact package for driving the shaft member 62 axially upon rotation of the gear 74. Although the ball nut transmission 39 is capable of providing only limited relative axial movement of either the nut member 64 or the shaft member 62, such design could be used in a mechanism when only limited movement is required such a sewing machine or weaving machine.

Once the shaft member 62 is threadably joined to the nut member 64 as in the prior described ball-nut transmissions shown in FIGS. 1–6, the encapsulation of the balls 66 between the helical groove 70 and the surface of the associated cavities allows them the freedom to rotate as with the ball-nut transmissions of FIGS. 1–6. In addition, the encapsulation in each of the ball-nut transmissions described above offers full surface-to-surface contact with the cavities supporting the balls rather than the line contact used by recirculating ball-nut-screw devices. With increased load bearing area per ball, the unit loading on the balls and the cavities is reduced so that less balls are require d than if a line contact recirculating system were to be used. Although the balls in the helical groove in the shaft member only enjoy line contact, the rotating-reciprocating motion of the shaft member and the nut member with respect to each other tends to spread the ball loads throughout many positions on the helical groove to reduce wear. Accordingly, the ball-nut transmissions disclosed herein present an example of a low-friction type ball-nut-screw arrangement without the problems of the recirculating balls.

Various changes and modifications can be made in the ball-nut transmission devices described above without departing from the spirit of the invention. Such changes and modifications are contemplated by the inventor and he does not wish to be limited except by the scope of the appended claims.

The embodiments of the invention in which an exclusive property or privilege is claimed are defined as follows:

1. A shaft and hub coupling comprising a cylindrical shaft member and a hub member having a cylindrical opening receiving one end of said shaft member, said hub member having an inner cylindrical surface defining said cylindrical opening and an outer cylindrical surface which is concentric with said inner cylindrical surface, a plurality of hemispherical cavities circumferentially spaced from each other and formed in said inner cylindrical surface, a spherical ball located in each of said hemispherical cavities, said shaft member having a cylindrical outer surface, a plurality of grooves formed in said outer surface of said shaft member for engaging each of said spherical balls and allowing said shaft member and said hub member to be locked to each other for cojoint rotary movement while allowing said shaft member and said hub member to move relative to each other in an axial direction when one of said members is rotated relative to the other of said members, and said hub member having a plurality of exposed and open access holes extending through said outer cylindrical surface of said hub member and through said inner cylindrical surface of said hub member, each of said plurality of access holes adapted to accommodate a cavity forming tool for forming in said inner cylindrical surface one of said plurality of hemispherical cavities that is located diametrically opposite said each of said plurality of access holes.

2. The shaft and hub coupling of claim 1 wherein said each of said grooves extend along the longitudinal center axis of said shaft.

3. The shaft and hub coupling of claim 1 wherein each of said grooves is semicircular in cross-section.

4. The shaft and hub coupling of claim 1 wherein each of said grooves starts at one end of said shaft.

5. The shaft and hub coupling of claim 1 wherein each of said plurality of access holes is cylindrical in configuration.

6. The shaft and hub coupling of claim 1 wherein each of said plurality of hemispherical cavities and the opposed groove have a depth for supporting one-half of the associated spherical ball.

7. A shaft and nut coupling comprising a cylindrical shaft member and a nut member having a cylindrical opening for receiving one end of said shaft member, said nut member having an inner cylindrical surface defining said cylindrical opening and an outer cylindrical surface which is substantially concentric with said inner cylindrical surface, said shaft member having an outer cylindrical surface dimensioned so as to be received by said inner cylindrical surface of said nut member and provide for relative movement of said shaft member and said nut member along the longitudinal center axis of said shaft member, a plurality of hemispherical cavities circumferentially spaced from each other and formed in said inner cylindrical surface of said nut member, a helical groove formed in said outer cylindrical surface of said shaft member, a spherical ball located in each of said hemispherical cavities, said grooves being semicircular in cross section and engaging each of said spherical balls in said hemispherical cavities so that rotation of one of said members relative to the other of said members causes said other of said members to move in an axial direction along said longitudinal axis, and said nut member having a plurality of exposed and open access holes extending through said outer cylindrical surface of said nut member and said inner cylindrical surface of said nut member, each of said plurality of access holes adapted to accommodate a cavity forming tool for forming in said inner cylindrical surface of said nut member one of said plurality of hemispherical cavities that is located diametrically opposite one of said each of said plurality of access holes.

8. The shaft and hub coupling of claim 7 wherein said helical groove is concave in cross-section.

9. The shaft and nut coupling of claim 7 wherein said helical groove starts at one end of said shaft member and ends at the other end of said shaft member.

10. The shaft and nut coupling of claim 7 wherein said access opening is cylindrical in configuration.

11. The shaft and nut coupling of claim 7 wherein each of said hemispherical cavities and the opposed groove have a depth for supporting approximately one-half of the associated spherical ball.

12. A mechanical transmission for converting rotary movement into linear movement comprising in combination, an elongate cylindrical shaft member, a nut member having a cylindrical opening for receiving one end of said shaft member, said nut member having an inner cylindrical surface defining said cylindrical opening and an outer cylindrical surface which is substantially concentric with said inner cylindrical surface, said shaft member having an outer cylindrical surface formed with a helical groove, a plurality of hemispherical cavities circumferentially spaced from each other and formed in the inner surface of said nut member along a helical path that matches the helical groove in said outer cylindrical surface of said shaft member, a spherical ball located in each of said hemispherical cavities, said helical groove being semicircular in cross section and engaging each of said spherical balls in said hemispherical cavities so that rotation of one of said members relative to the other of said members causes said other of said members to move in an axial direction, and said nut member having an exposed and open access hole formed between said outer cylindrical surface and said inner cylindrical surface of said nut member in a diametrically opposed position relative to each of said hemispherical cavities to allow a tool to move through said access hole and form one of said plurality of hemispherical cavities for accommodating one of said spherical balls.

* * * * *